United States Patent [19]

Iuchi et al.

[11] Patent Number: 5,530,115
[45] Date of Patent: Jun. 25, 1996

[54] PROCESS FOR PRODUCING CRYSTALLINE I-TYPE OXYTITANIUM PHTHALOCYANINE

[75] Inventors: Kazushi Iuchi; Hajime Miyazaki; Hideyuki Takai; Itaru Yamazaki, all of Yokohama, Japan

[73] Assignee: Canon Kabushiki Kaisha, Tokyo, Japan

[21] Appl. No.: 386,346

[22] Filed: Feb. 10, 1995

Related U.S. Application Data

[63] Continuation of Ser. No. 255,817, Jun. 7, 1994, abandoned, which is a continuation of Ser. No. 115,264, Sep. 2, 1993, abandoned, which is a continuation of Ser. No. 622,837, Dec. 5, 1990, abandoned.

[30] Foreign Application Priority Data

Dec. 8, 1989 [JP] Japan ................................ 1-319934
Dec. 8, 1989 [JP] Japan ................................ 1-319935

[51] Int. Cl.$^6$ ........................................... C09B 67/50
[52] U.S. Cl. ............................................. 540/141
[58] Field of Search ................................. 540/141

[56] References Cited

U.S. PATENT DOCUMENTS

| | | | |
|---|---|---|---|
| 4,444,861 | 4/1984 | Nogami | 430/58 |
| 4,664,997 | 5/1987 | Suzuki et al. | 430/58 |
| 4,728,592 | 3/1988 | Ohaku et al. | 430/59 |
| 4,994,339 | 2/1991 | Kinoshita et al. | 430/78 |
| 5,059,355 | 10/1991 | Ono et al. | 910/141 |
| 5,132,197 | 7/1992 | Iuchi et al. | 430/76 |
| 5,350,844 | 9/1994 | Martin | 540/141 |
| 5,432,278 | 7/1995 | Yamazaki | 548/141 |

FOREIGN PATENT DOCUMENTS 384470  8/1990  European Pat. Off. ............... 540/141

OTHER PUBLICATIONS

Gardner, Ed. "Handbook of chemical synonyms and trade names" (CRC Press, 1978) p. 536.
Grant, Ed. "Hackh's Chemical Dictionary, 4th Edition" (1980, McGraw-Hill) pp. 488, 504.
Neufeldt, "Webster's New World Dictionary, Third College Edition", (Prentice Hall, 1988) p. 1011.
Hackh's Dictionary, 3rd Edition, p. 615 (1970).
Ono, Chem Abs 114, 14916n (1990).
Abstract for JP-63-000364 (1988).
Abstract for JP-63-000365 (1988).
Abstract for JP-63-37163 (1988).
Abstract for JP-63-57670 (1988).
Abstract for JP-63-80263 (1988).
Webster's 3rd New Int. Dictionary p. 1691.
Hawley's Condensed Chem Dictionary p. 892.
Abstract for JP 59-49544 (1984).
Abstract for JP 59-166969 (1984).
Abstract for JP 61-239248 (1986).
Abstract for JP 62-067094 (1987).
Abstract for JP 63-000366 (1988).
Abstract for JP 63-116158 (1988).
Abstract for JP 63-198067 (1988).
Abstract for JP 01-17066 (1989).

*Primary Examiner*—Mark L. Berch
*Attorney, Agent, or Firm*—Fitzpatrick, Cella, Harper & Scinto

[57] ABSTRACT

The present invention relates to a process for producing a crystalline I-type oxytitanium phthalocyanine having strong peaks in CuKα characteristic X-ray diffraction at Bragg angles (2θ±0.2°) of 9.0°, 14.2°, 23.9°, and 27.1°, comprising milling-treatment of oxytitanium phthalocyanine or an aqueous paste thereof with a solvent containing a saturated hydrocarbon solvent.

7 Claims, 8 Drawing Sheets

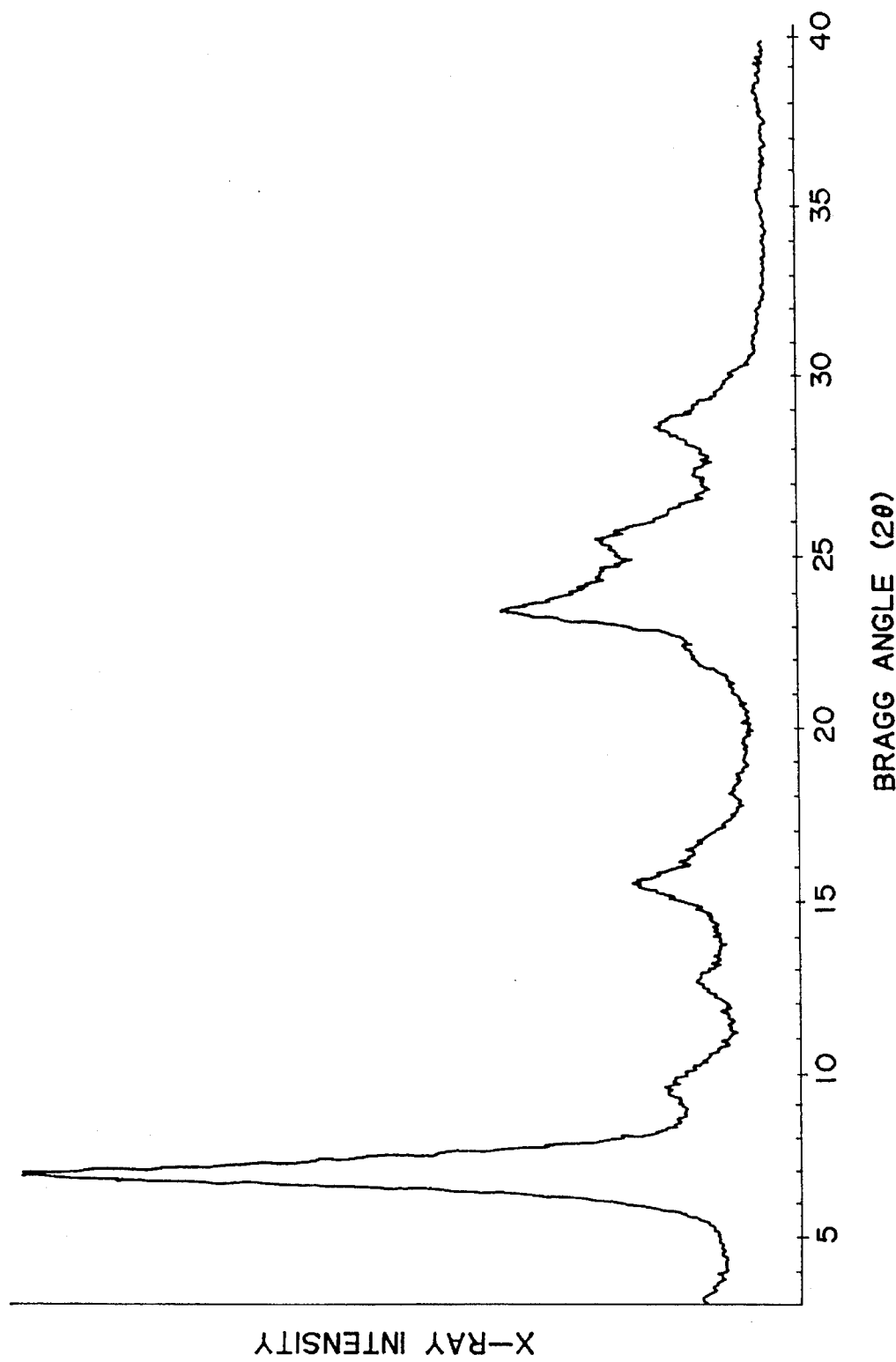

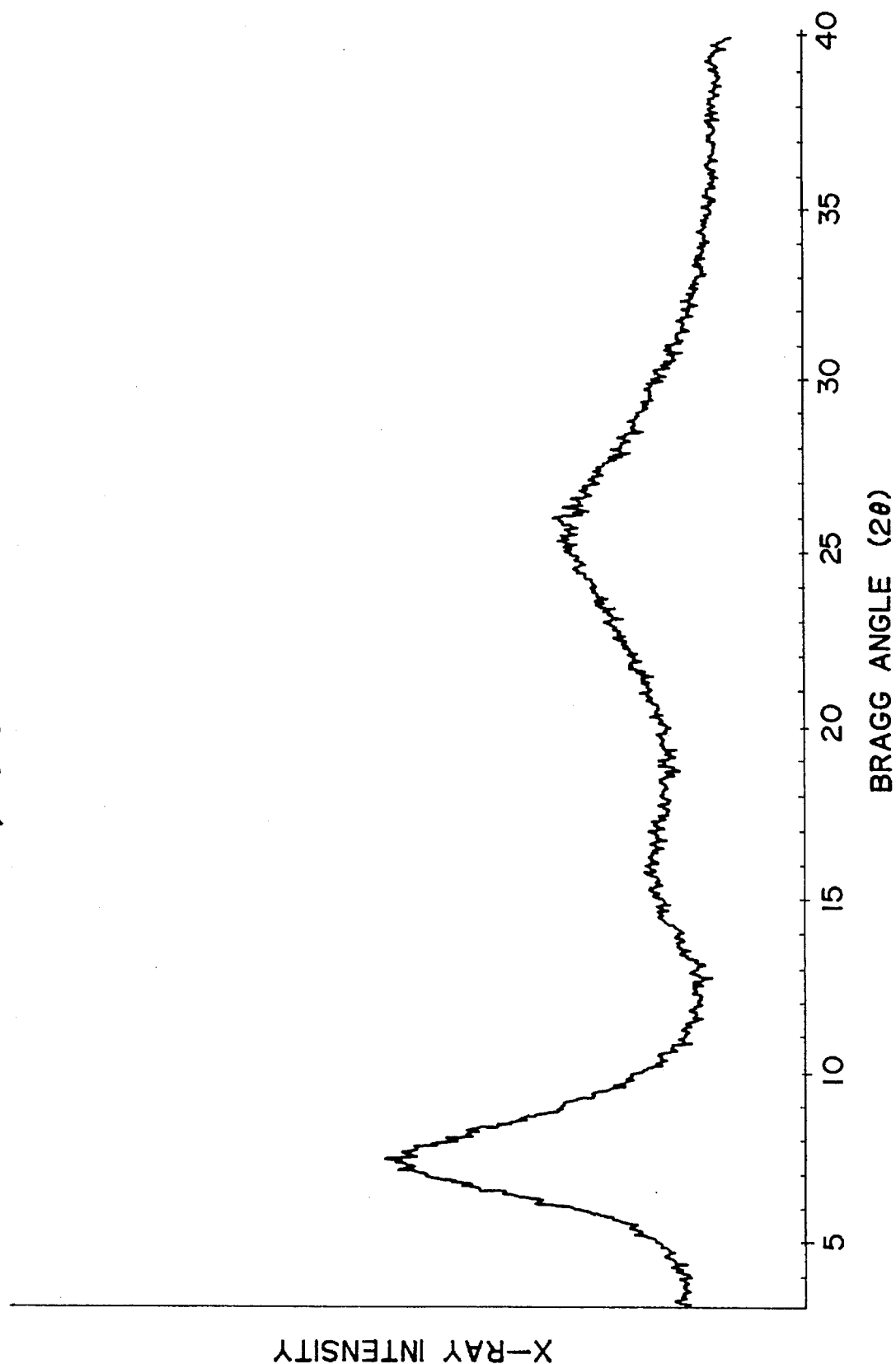

PROCESS FOR PRODUCING CRYSTALLINE I-TYPE OXYTITANIUM PHTHALOCYANINE

This application is a continuation of application Ser. No. 08/255,817 filed Jun. 7, 1994; which in turn is a continuation of application Ser. No. 08/115,264, filed Sep. 2, 1993; which in turn is a continuation of application Ser. No. 07/622,837, filed Dec. 5, 1990, all now abandoned.

BACKGROUND OF THE INVENTION

1. Field of the Invention

The present invention relates to a process for producing crystalline oxytitanium phthalocyanine. More particularly, the present invention relates to a process for producing crystalline oxytitanium phthalocyanine of type-I which shows strong peaks in CuKα characteristic X-ray diffraction at Bragg angles (2θ±0.2°) of 9.0°, 14.2°, 23.9°, and 27.1°.

2. Related Background Art

Phthalocyanine pigments have come to be employed extensively as catalysts, electrophotographic sensitive members, solar batteries, sensors, etc., as well as in conventional uses for coloration of paints, inks, resins, and the like.

Among the phthalocyanine pigments, oxytitanium phthalocyanine is known to have excellent characteristics for an electrophotographic material. The characteristics vary depending on the crystal form of the oxytitanium phthalocyanine. A variety of crystal forms of oxytitanium phthalocyanine are obtained depending on the minute differences of production conditions.

Oxytitanium phthalocyanines having different crystal structures produced under various production conditions were described, for example, in JP-A Sho-59- 49544 (U.S. Pat. No. 4,444,861)("JP-A" refers to Japanese Patent Application Laid-Open No.), JP-A Sho- 59-166959, JP-A Sho-61-239248 (U.S. Pat. No. 4,728,592), JP-A 62-67094 (U.S. Pat. No. 4,664,997), JP-A Sho-63-366, JP-A 63-116158, JP-A Sho-63-198067, JP-A Sho-64-17066, and so forth. The crystal forms described in the above patent publications, however, are obtained usually as a mixture, which involves difficulty in uniformity of the quality of the products. Accordingly, a method has been desired which gives a pure crystal form of oxytitanium phthalocyanine and many attempts have been made therefor. Processes for production of A-type or C-type crystal are described, for example, in JP-A Sho-63-364, JP-A Sho-63-365, JP-A Sho-63-37163, JP-A Sho-63-57670, JP-A Sho-63-80263, and so forth.

It is described in Japanese Patent Application No. Hei-1-189200 that the oxytitanium phthalocyanine is a crystal form having strong peaks at Bragg angles (2θ±0.2°) of 9.0°, 14.2°, 23.9°, and 27.1° in CuKα characteristic X-ray diffraction. Specifically I-type oxytitanium phthalocyanine, has excellent characteristics for electrophotographic sensitive materials. Although the I-type oxytitanium phthalocyanine can be readily prepared in laboratories according to the preparation method described in the specification of the above patent application, the process is not sufficiently satisfactory regarding the employed solvents, from the standpoint of industrial production. For example, regarding the solvent used in the milling treatment, the ether type solvents are flammable, and further may be explosive if peroxide is formed; the monoterpene type solvents are not readily available for general use; and the liquid paraffin requires a long time for the treatment and is not easy to handle because of its high viscosity.

SUMMARY OF THE INVENTION

The present invention intends to provide a process for producing I-type oxytitanium phthalocyanine in a pure form.

The present invention further intends to provide a process for producing I-type oxytitanium phthalocyanine, which is suitable for industrialization and allows mass-production thereof in a simple process.

The present invention provides a process for producing I-type crystalline oxytitanium phthalocyanine which shows strong peaks in CuKα characteristic X-rays diffraction at Bragg angles (2θ±0.2°) of 9.0°, 14.2°, 23.9° and 27.1°, comprising milling-treatment of oxytitanium phthalocyanine or an aqueous paste thereof with a solvent containing a saturated hydrocarbon solvent.

BRIEF DESCRIPTION OF THE DRAWINGS

FIG. 6, FIG. 7, and FIG. 8 are respectively X-ray patterns of dried matter of the aqueous paste (1), the aqueous paste (2), or the aqueous paste (3).

DETAILED DESCRIPTION OF THE PREFERRED EMBODIMENT

The X-ray diffraction pattern (employing CuKα characteristic X-ray) of I-type crystal of the oxytitanium phthalocyanine produced according to the present invention has strong peaks at the Bragg angles (2θ±0.2°) of 9.0°, 14.2°, 23.9°, and 27.1°. These are the strongest four peaks, and are the main peaks.

The structure of the oxytitanium phthalocyanine is represented by the formula below:

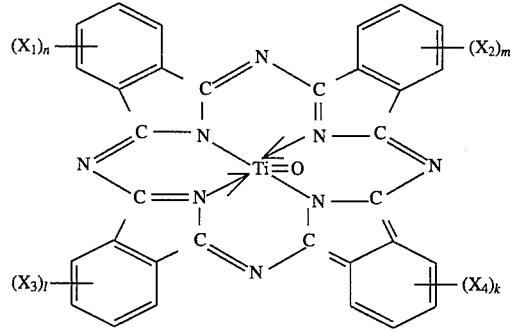

where $X_1$, $X_2$, $X_3$, and $X_4$ denote respectively Cl, or Br, and n, m, l, and k denote respectively an integer of from 0 to 4.

Figure 1:
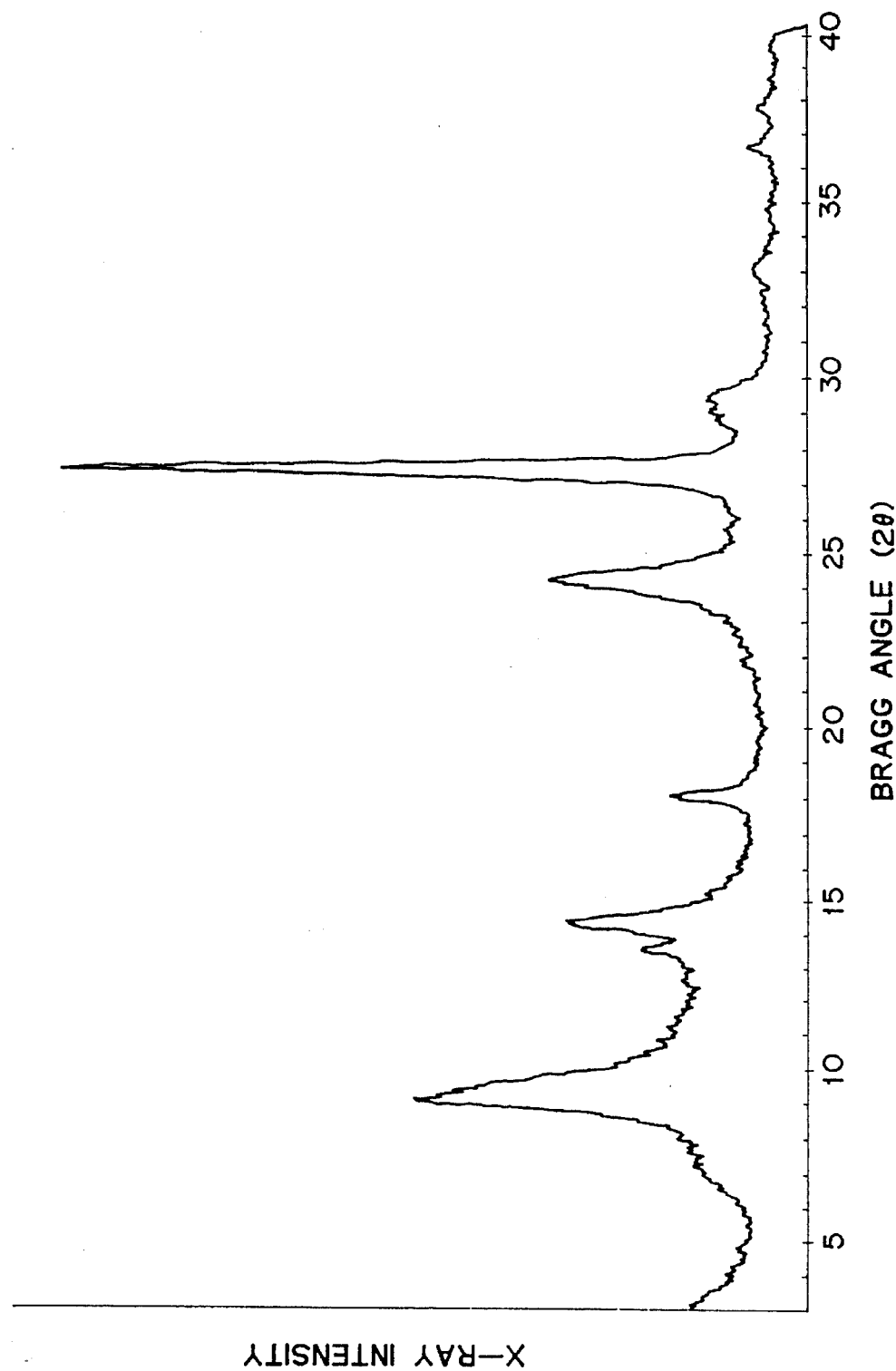
FIG. 1 is an X-ray diffraction pattern of I-type oxytitanium phthalocyanine.
Figure 2:
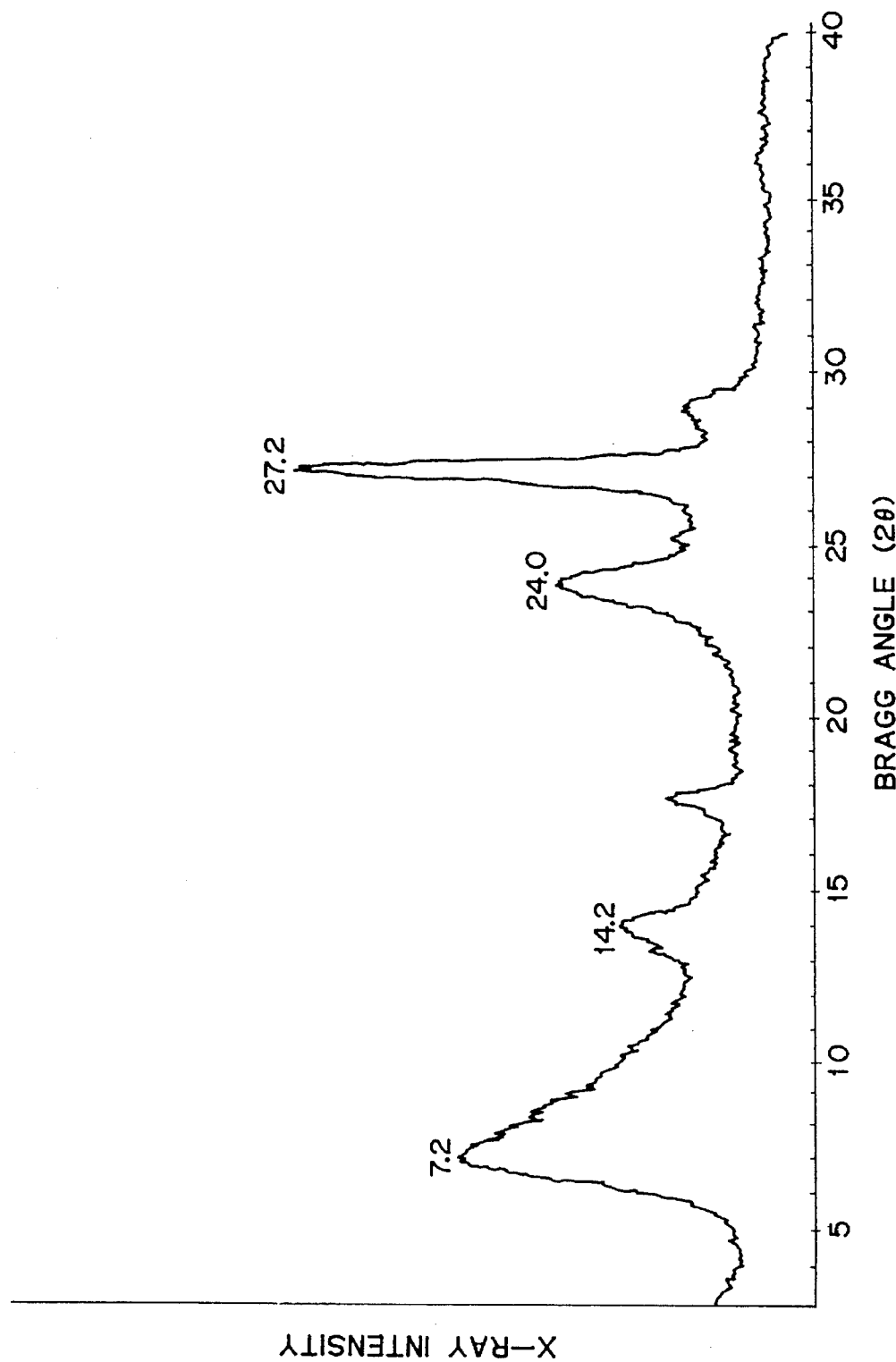
FIG. 2 is an X-ray diffraction pattern of M-type oxytitanium phthalocyanine.
Figure 3:
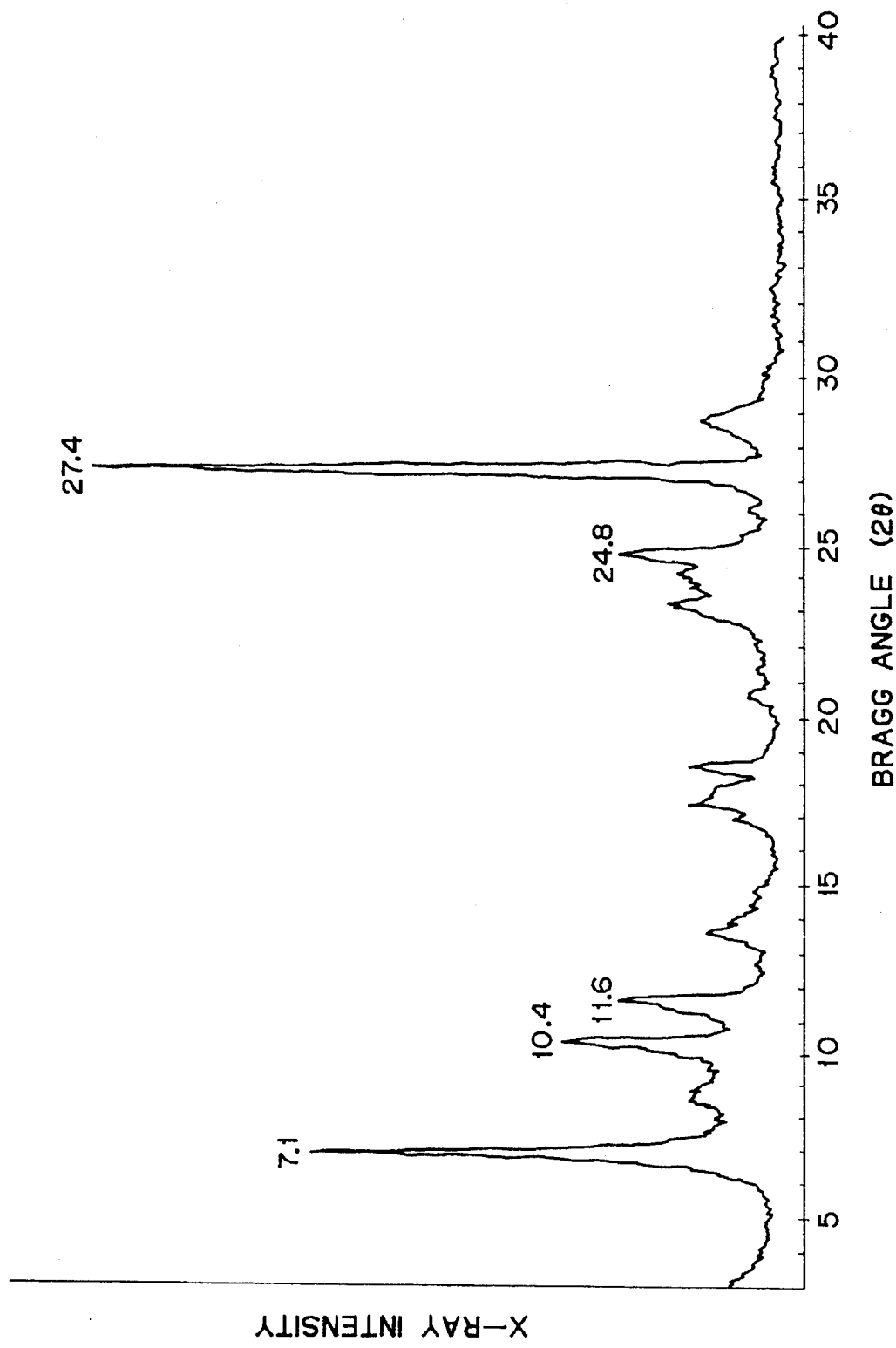
FIG. 3 is an X-ray diffraction pattern of Mc-type oxytitanium phthalocyanine.

In the present invention, in the case where an aqueous paste oxytitanium phthalocyanine is not employed, the preferable oxytitanium phthalocyanine is of type M having main peaks at Bragg angles (2θ±0.2°) of 7.2°, 14.2°, 24.0°, and 27.2° in CuKα characteristic X-ray diffraction as shown in FIG. 2, or type Mc having main peaks at Bragg angles (2θ±0.2°) of 7.1°, 10.4°, and 27.3° in CuKα characteristic X-ray diffraction as shown in FIG. 3. The milling treatment of either M-type oxytitanium phthalocyanine or Mc-type oxytitanium phthalocyanine similarly gives I-type crystalline oxytitanium phthalocyanine, so that the mixture of the M-type and the Mc-type may be employed without any problem.

In the present invention, in the case where an aqueous paste of oxytitanium phthalocyanine is employed, the paste is preferably derived by a conventional acid-pasting method. This aqueous paste needs to uniformly contain water. The preferable solid content is within the range of from 15% to 45% by weight. The crystal form of the oxytitanium phthalocyanine used in the aqueous paste is not specially limited. The oxytitanium phthalocyanine contained in the aqueous paste takes on various forms, such as a slightly amorphous crystal forms or an amorphous form, depending on the conditions of the acid pasting treatment such as the amount of sulfuric acid, the amount of water, and the treatment temperature. However, any of the amorphous forms, as for example, a slightly amorphous crystal form and their mixtures may be used, provided that they have been subjected to an acid-pasting treatment.

The saturated hydrocarbon solvent for the dispersing medium for the milling treatment preferably includes aliphatic saturated hydrocarbon solvents having a main chain of 5 to 12 carbons in the molecule, which may have a methyl group in 2-position, such as n-pentane, n-hexane, n-octane, n-decane, n-dodecane, 2-methylpentane, 2-methyloctane, and the like. A mixed solvent containing the above-mentioned solvent as the main component may also be used, for example, solvents such as ligroin, petroleum benzin and the like.

The amount of the dispersion solvent may be arbitrarily selected. Preferably the amount is within the range of from 5 to 40 parts by weight based on 1 part of oxytitanium phthalocyanine. With a lesser amount of the solvent, the viscosity of the treating liquid becomes high, which prevents uniform treatment. In contrast, with a larger amount of the solvent, the amount of treated material in a unit volume is decreased, which lowers the productivity.

For the dispersion in the milling process of the present invention ordinary media can be used such as glass beads, steel beads, aluminum beads, and the like.

The treatment time is preferably not less than one hour, particularly preferable within the range of from 5 hours to 30 hours. The treatment time of less than one hour may cause the incomplete conversion of the crystal, while the treatment time exceeding 30 hour is not desirable in view of loss of productivity.

Although the treatment temperature is not particulary defined, the temperature is preferably not higher than 80° C. in view of stability of the crystal.

The present invention is described more specifically, referring to Examples and Reference examples.

EXAMPLE 1

To 2.0 kg of M-type low-crystalline oxytitanium phthalocyanine, 40 kg of n-hexane was added. The mixture was subjected to milling treatment by use of glass beads of 1 mm in diameter at room temperature for 15 hours. The solid matter was separated from the liquid dispersion. The solid matter was then washed sufficiently with methanol and subsequently with deionized water and dried to give I-type crystalline oxytitanium phthalocyanine in a yield of 1.9 kg.

EXAMPLES 2–13, AND REFERENCE EXAMPLES 1–10

The same treatment as in Example 1 was conducted except that the crystal form of the starting oxytitanium phthalocyanine, the treatment solvent, and the treatment time were changed. The results are shown in Table 1 and Table 2.

Figure 4:
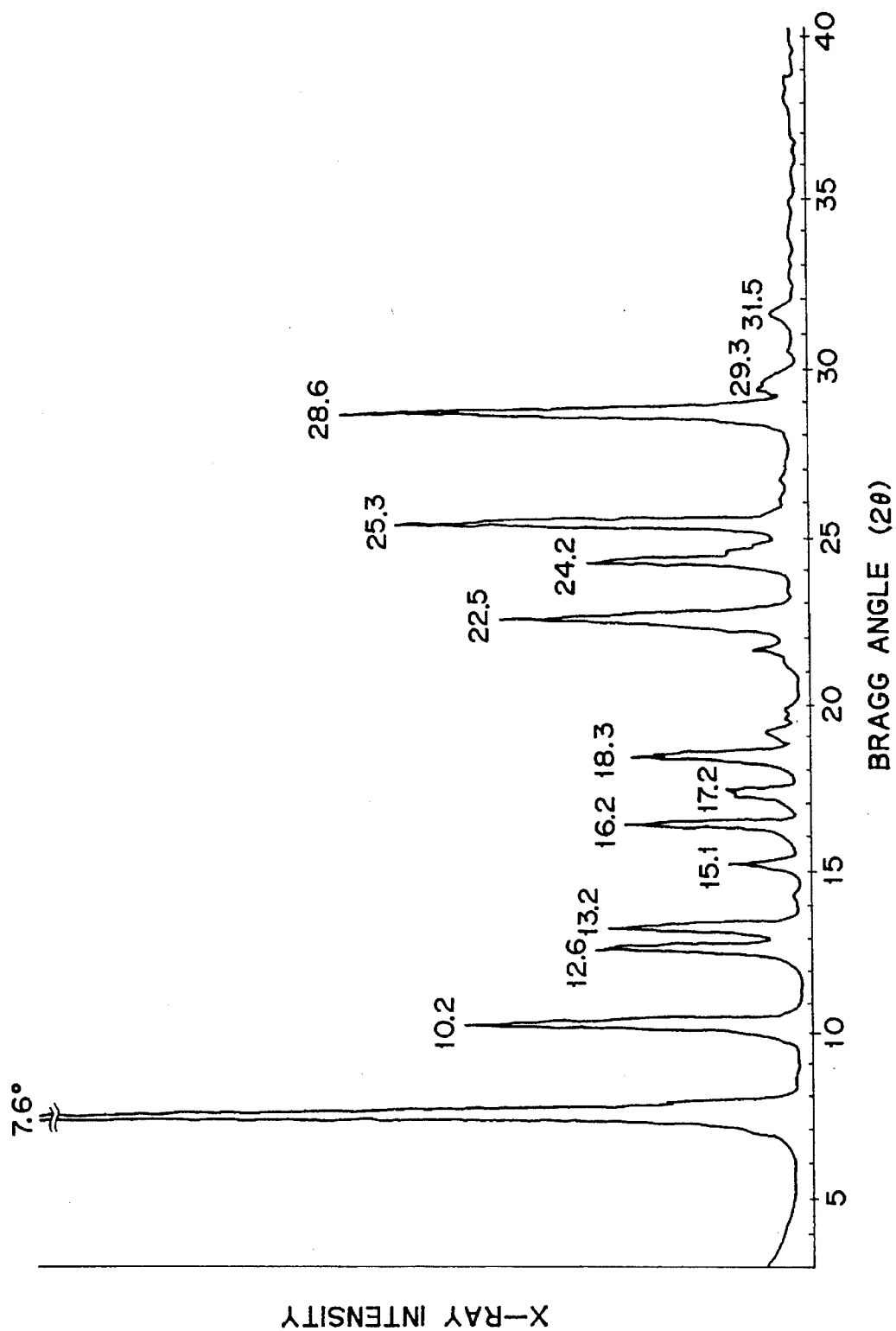
FIG. 4 is an X-ray diffraction pattern of B-type oxytitanium phthalocyanine.
Figure 5:
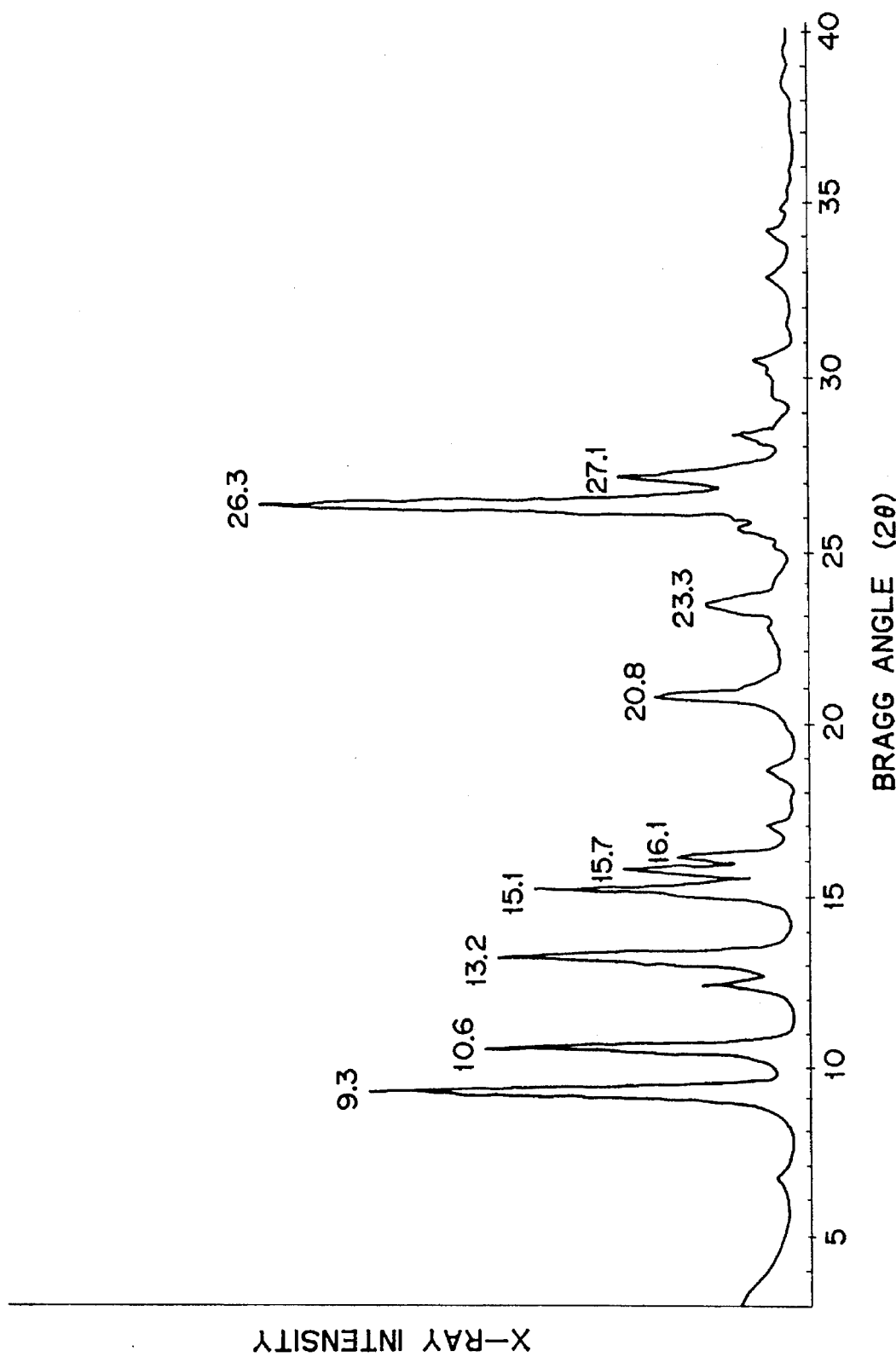
FIG. 5 is an X-ray diffraction pattern of A-type oxytitanium phthalocyanine.

The B-type and A-type crystalline oxytitanium phthalocyanines shown in Table 2 as the starting materials were prepared respectively according to preparation examples disclosed in JP-A Sho-61-239248 (U.S. Pat. No. 4,728,592), or JP-A Sho-62-67094 (U.S. Pat. No. 4,664,997). The X-ray diffraction patterns thereof are shown respectively in FIG. 4 and FIG. 5.

TABLE 1

| Example No. | Crystal form of starting oxytitanium phthalocyanine | Treatment solvent | Treatment time | Crystal form of resulting oxytitanium phthalocyanine |
|---|---|---|---|---|
| 1 | Type M | n-Hexane | 15 hours | Type I |
| 2 | Type M | n-Octane | 15 hours | Type I |
| 3 | Type M | 2-methylpentane | 15 hours | Type I |
| 4 | Type M | 2-methyloctane | 15 hours | Type I |
| 5 | Type Mc | n-Hexane | 20 hours | Type I |
| 6 | Type Mc | n-Decane | 20 hours | Type I |
| 7 | Type Mc | n-Dodecane | 20 hours | Type I |
| 8 | Type Mc | 2-methyloctane | 20 hours | Type I |
| 9 | Mixture of Type-M 50% and Type-Mc 50% | n-Hexane | 20 hours | Type I |
| 10 | Mixture of Type-M 50% and Type-Mc 50% | n-Octane | 20 hours | Type I |
| 11 | Mixture of Type-M 80% and Type-Mc 20% | n-Hexane | 20 hours | Type I |
| 12 | Mixture of Type-M 80% and Type-Mc 20% | n-Decane | 20 hours | Type I |
| 13 | Mixture of Type-M 80% and Type-Mc 20% | Ligroin | 20 hours | Type I |

TABLE 2

| Reference Example No. | Crystal form of starting oxytitanium phthalocyanine | Treatment solvent | Treatment time | Crystal form of resulting oxytitanium phthalocyanine |
| --- | --- | --- | --- | --- |
| 1 | Type B | n-Hexane | 15 hours | Type B |
| 2 | Type A | n-Hexane | 15 hours | Type A |
| 3 | Type B | n-Octane | 20 hours | Type B |
| 4 | Type A | n-Octane | 20 hours | Type A |
| 5 | Type B | n-Decane | 20 hours | Type B |
| 6 | Type A | n-Decane | 20 hours | Type A |
| 7 | Type B | 2-Methyloctane | 20 hours | Type B |
| 8 | Type A | 2-Methyloctane | 20 hours | Type A |
| 9 | Type B | 2-Methyloctane | 20 hours | Type B |
| 10 | Type A | 2-Methyloctane | 20 hours | Type A |

EXAMPLE 14

Crystalline oxytitanium phthalocyanine which is generally called type B was prepared according to the preparation example disclosed in JP-A Sho-61- 39248 (U.S. Pat. No. 4,728,592). 2.0 kg of this B-type crystalline matter was gradually added into 60 kg of concentrated sulfuric acid at a temperature of not higher than 5° C., and was dissolved therein. The solution was added dropwise into 600 kg of ice water over 2 hours. The resulting pigment was collected by filtration and washed with water to prepare an aqueous paste of oxytitanium phthalocyanine (hereinafter referred to as "Aqueous paste (1)"). The solid content of this aqueous paste was 20%.

Figure 6:
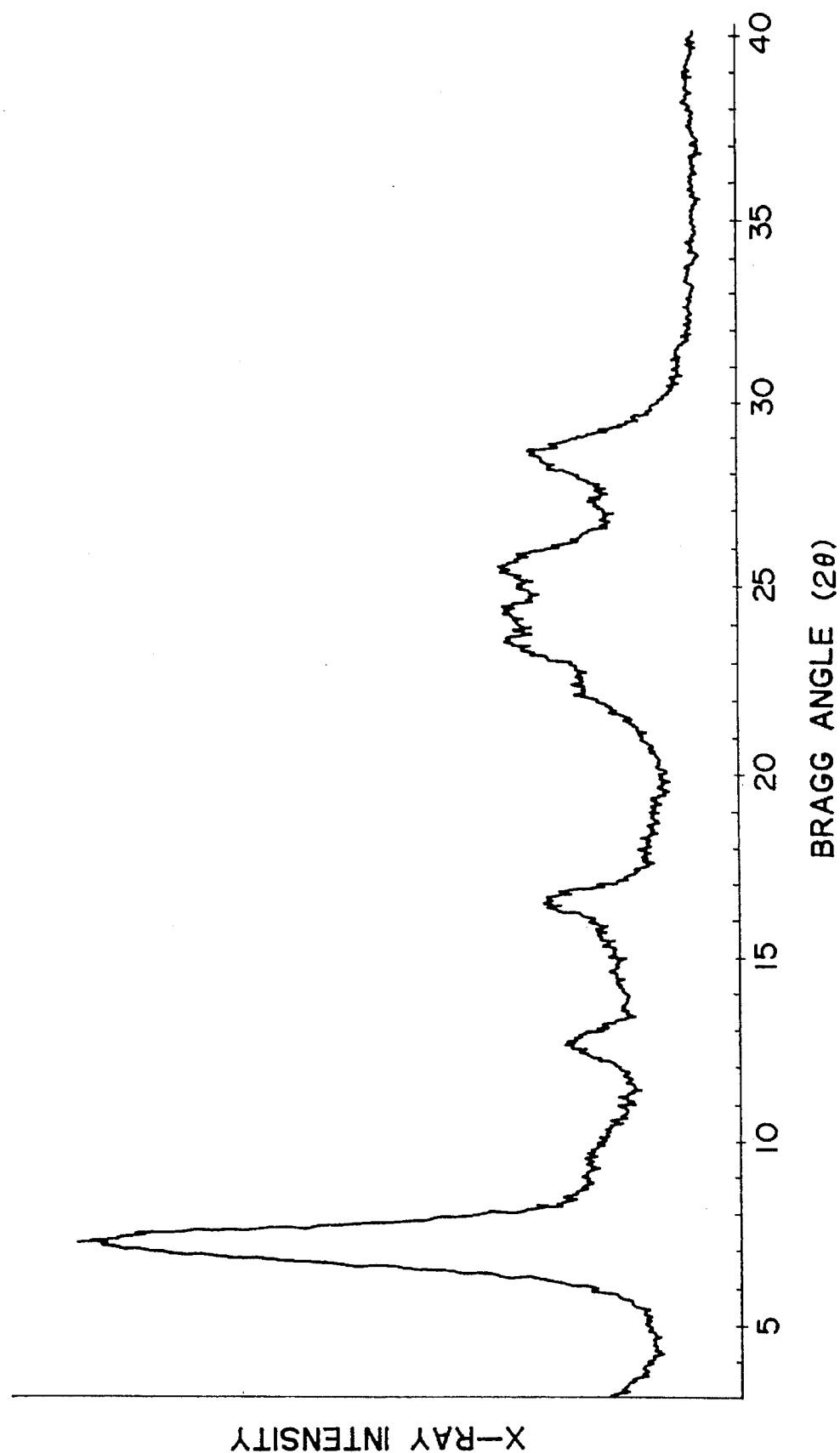

A portion of this aqueous paste was dried and subjected to X-ray diffraction measurement. The X-ray diffraction pattern is shown in FIG. 6.

n-hexane (20 kg) was added to 5.0 kg of Aqueous paste (1), and the mixture was subjected to milling treatment with glass beads of 1 mm in diameter at 20° C. for 20 hours. The solid matter was separated from this liquid dispersion, and was washed sufficiently with n-hexane and dried to give I-type crystalline oxytitanium phthalocyanine in a yield of 0.9 kg.

EXAMPLES 15–23

The treatment was conducted in the same manner as in Example 1 except that the treatment solvent, the treatment time, and the treatment temperature were changed. The results are shown in Table 3.

800 kg of water at 25° C. in one hour. The resulting pigment was collected by filtration and washed with water to prepare an aqueous paste of oxytitanium phthalocyanine (hereinafter referred to as "Aqueous paste (2)"). The solid content of this aqueous paste was 24%.

A portion of this aqueous paste was dried and subjected to X-ray diffraction measurement. The X-ray diffraction pattern is shown in FIG. 7.

n-hexane (20 kg) was added to 4.2 kg of Aqueous paste (2), and the mixture was subjected to milling treatment with glass beads of 1 mm in diameter at 20° C. for 20 hours. The solid matter was separated from this liquid dispersion, and was washed sufficiently with n-hexane and dried to give I-type crystalline oxytitanium phthalocyanine in a yield of 0.9 kg.

EXAMPLES 25–31

The treatment was conducted in the same manner as in Example 9 except that the treatment solvent, the treatment time, and the treatment temperature were changed. The results are shown in Table 4.

TABLE 3

| Example No. | Starting oxytitanium phthalocyanine | Treatment solvent | Treatment temperature (°C.) | Treatment time (hours) | Resulting crystal form |
| --- | --- | --- | --- | --- | --- |
| 14 | Aqueous paste (1) | n-Hexane | 20 | 20 | Type I |
| 15 | Aqueous paste (1) | n-Octane | 20 | 20 | Type I |
| 16 | Aqueous paste (1) | n-Decane | 20 | 20 | Type I |
| 17 | Aqueous paste (1) | n-Octane | 50 | 15 | Type I |
| 18 | Aqueous paste (1) | n-Dodecane | 50 | 15 | Type I |
| 19 | Aqueous paste (1) | n-Dodecane | 70 | 10 | Type I |
| 20 | Aqueous paste (1) | 2-Methylpentane | 50 | 15 | Type I |
| 21 | Aqueous paste (1) | 2-Methyloctane | 50 | 20 | Type I |
| 22 | Aqueous paste (1) | Ligroin | 20 | 20 | Type I |
| 23 | Aqueous paste (1) | Petroleum benzine | 20 | 20 | Type I |

EXAMPLE 24

2.0 kg of the B-type oxytitanium phthalocyanine used in Example 14 was gradually added into 60 kg of concentrated sulfuric acid at a temperature of not higher than 5° C., and was dissolved therein. The solution was added dropwise into

TABLE 4

| Example No. | Starting oxytitanium phthalocyanine | Treatment solvent | Treatment temperature (°C.) | Treatment time (hours) | Resulting crystal form |
|---|---|---|---|---|---|
| 24 | Aqueous paste (2) | n-Hexane | 20 | 20 | Type I |
| 25 | Aqueous paste (2) | n-Octane | 20 | 20 | Type I |
| 26 | Aqueous paste (2) | n-Decane | 20 | 20 | Type I |
| 27 | Aqueous paste (2) | n-Octane | 20 | 15 | Type I |
| 28 | Aqueous paste (2) | n-Dodecane | 50 | 15 | Type I |
| 29 | Aqueous paste (2) | n-Dodecane | 70 | 10 | Type I |
| 30 | Aqueous paste (2) | 2-Methylpentane | 50 | 15 | Type I |
| 31 | Aqueous paste (2) | 2-Methyloctane | 50 | 20 | Type I |

EXAMPLE 32

A-type oxytitanium phthalocyanine was prepared according to preparation example disclosed in JP-A Sho- 62-67094 (U.S. Pat. No. 4,664,997). 2.0 kg of this A-type oxytitanium phthalocyanine was gradually added into 80.0 kg of concentrated sulfuric acid at a temperature of 30° C. or lower, and was dissolved therein. The solution was added dropwise into 800 kg of water at 30° C. in 30 minutes. The resulting pigment was collected by filtration and washed with water to prepare an aqueous paste of oxytitanium phthalocyanine (hereinafter referred to as "Aqueous paste (3)"). The solid content of this aqueous paste was 22%.

A portion of this aqueous paste was dried and subjected to X-ray diffraction measurement. The X-ray pattern is shown in FIG. 8.

n-hexane (20 kg) was added to 4.5 kg of Aqueous paste (3), and the mixture was subjected to milling treatment with glass beads of 1 mm in diameter at 20° C. for 20 hours. The solid matter was separated from this liquid dispersion, and was washed sufficiently with n-hexane and dried to give I-type crystalline oxytitanium phthalocyanine in a yield of 0.9 kg.

EXAMPLES 33–39

The treatment was conducted in the same manner as in Example 32 except that the treatment solvent, the treatment time, and the treatment temperature were changed. The results are shown in Table 5.

TABLE 5

| Example No. | Starting oxytitanium phthalocyanine | Treatment solvent | Treatment temperature (°C.) | Treatment time (hours) | Resulting crystal form |
|---|---|---|---|---|---|
| 32 | Aqueous paste (3) | n-Hexane | 20 | 20 | Type I |
| 33 | Aqueous paste (3) | n-Octane | 20 | 20 | Type I |
| 34 | Aqueous paste (3) | n-Decane | 20 | 20 | Type I |
| 35 | Aqueous paste (3) | n-Octane | 50 | 15 | Type I |
| 36 | Aqueous paste (3) | n-Dodecane | 50 | 15 | Type I |
| 37 | Aqueous paste (3) | n-Dodecane | 70 | 10 | Type I |
| 38 | Aqueous paste (3) | 2-Methylpentane | 50 | 15 | Type I |
| 39 | Aqueous paste (3) | 2-Methyloctane | 50 | 20 | Type I |

REFERENCE EXAMPLES 11–25

The same treatment as in Example 14 was conducted except that Aqueous paste (1) and the treatment time and the treatment time are changed as shown in Table 6. The results are shown in Table 6.

The B-type and A-type crystalline oxytitanium phthalocyanines were prepared respectively according to preparation examples disclosed in JP-A Sho-61- 239248 (U.S. Pat. No. 4,728,592), or JP-A Sho-62-67094 (U.S. Pat. No. 4,664, 997).

TABLE 6

| Reference Example No. | Starting oxytitanium phthalocyanine | Treatment solvent | Treatment temperature (°C.) | Treatment time (hours) | Resulting crystal form |
|---|---|---|---|---|---|
| 12 | Type B | n-Hexane | 20 | 20 | Type B |
| 13 | Type B | n-Octane | 20 | 20 | Type B |
| 14 | Type B | n-Dodecane | 50 | 15 | Type B |
| 15 | Type A | n-Hexane | 20 | 20 | Type A |
| 16 | Type A | n-Octane | 20 | 20 | Type A |
| 17 | Type A | n-Dodecane | 50 | 15 | Type A |
| 18 | Dried matter of aqueous paste (1) | n-Hexane | 20 | 20 | Type B |
| 19 | Dried matter of aqueous paste (2) | n-Hexane | 20 | 20 | Type B |
| 20 | Dried matter of aqueous paste (3) | n-Hexane | 20 | 20 | Type B |
| 21 | Dried matter of aqueous paste (1) | n-Octane | 20 | 20 | Type B |
| 22 | Dried matter of aqueous paste (1) | n-Octane | 40 | 20 | Type B |
| 23 | Dried matter of aqueous paste (1) | n-Decane | 60 | 15 | Type B |
| 24 | Dried matter of aqueous paste (1) | n-Dodecane | 60 | 15 | Type B |
| 25 | Dried matter of aqueous paste (1) | 2-Methyloctane | 20 | 30 | Type B |

What is claimed is:

1. A process for producing a crystalline I-type oxytitanium phthalocyanine having strong peaks in CuKα characteristic X-ray diffraction at Bragg angles (2θ±0.2°) of 9.0°, 14.2°, 23.9° and 27.1°, comprising: milling-treatment one of (A) or (B) with a solvent selected from the group consisting of n-pentane, n-hexane, n-octane, n-decane, n-dodecane, 2-methylpentane, 2-methyloctane, ligroin, petroleum benzin and mixtures thereof wherein;

(A) is at least one oxytitanium phthalocyanine selected from the group consisting of a first oxytitanium phthalocyanine having strong peaks in CuKα characteristic X-ray diffraction at Bragg angles (2θ±0.2°) of 7.2°, 14.2°, 24.0° and 27.2° and a second oxytitanium phthalocyanine having strong peaks in CuKα characteristics X-ray diffraction at Bragg angles (2θ±0.2°) of 7.1°, 10.4° and 27.3°; and (B) is an aqueous paste of a third oxytitanium phthalocyanine.

2. The process of claim 1, wherein the oxytitanium phthalocyanine to be treated has strong CuKα peaks in characteristic X-ray diffraction at Bragg angles (2θ±0.2°) of 7.1°, 10.4°, and 27.3° and the aqueous paste is not employed.

3. The process of claim 1, wherein the the oxytitanium phthalocyanine to be treated is a mixture of a first oxytitanium phthalocyanine having strong CuKα peaks in characteristic X-ray diffraction at Bragg angles (2θ±0.2°) of 7.2°, 14.2°, 24.0°, and 27.2°, and a second oxytitanium phthalocyanine having strong peaks in CuKα characteristic X-ray diffraction at Bragg angles (2θ±0.2°) of 7.1°, 10.4°, and 27.3° and the aqueous paste is not employed.

4. The process of claim 1, wherein the aqueous paste to be treated is derived according to an acid-pasting method.

5. The process of claim 1, wherein the weight ratio of the oxytitanium phthalocyanine to the solvent is in the range of from 1:5 to 1:40.

6. The process of claim 1, wherein the milling treatment is conducted at a temperature not higher than 80° C.

7. The process of claim 1, wherein the oxytitanium phthalocyanine to be treated has strong peaks in CuKα characteristic X-ray diffraction at Bragg angles (2θ±0.2°) of 7.2°, 14.2°, 24.0°, and 27.2° and the aqueous paste is not employed.

* * * * *